Feb. 1, 1949. L. T. KINCANNON 2,460,419
OUTBOARD MOTOR
Filed April 14, 1943 9 Sheets-Sheet 1

Inventor:
Leo T. Kincannon
By: Eugene H. Simpson
Attorney

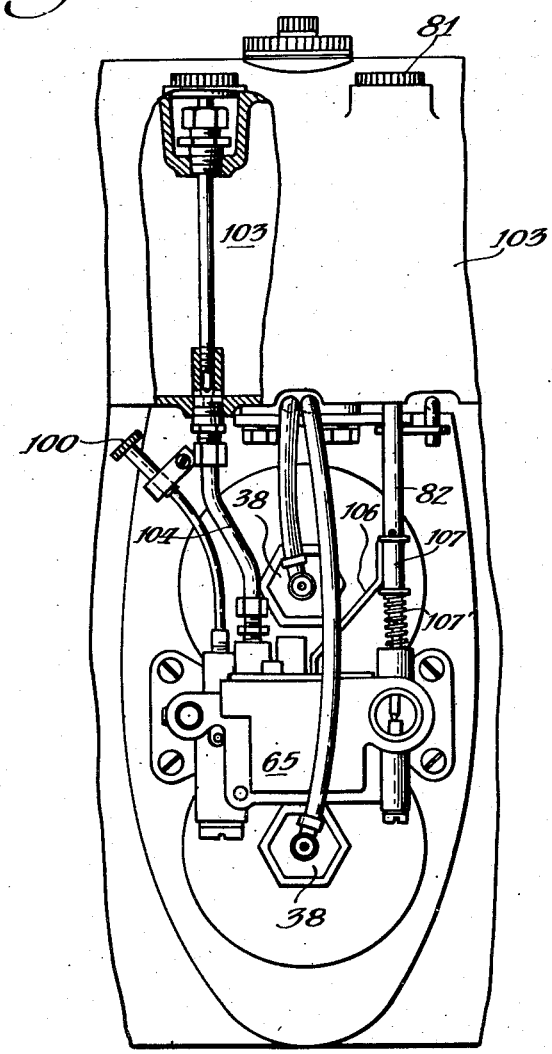
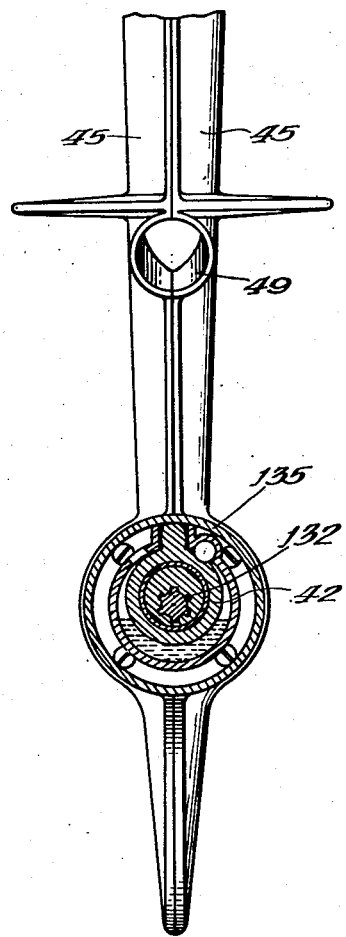

Feb. 1, 1949.  L. T. KINCANNON  2,460,419
OUTBOARD MOTOR
Filed April 14, 1943  9 Sheets-Sheet 5
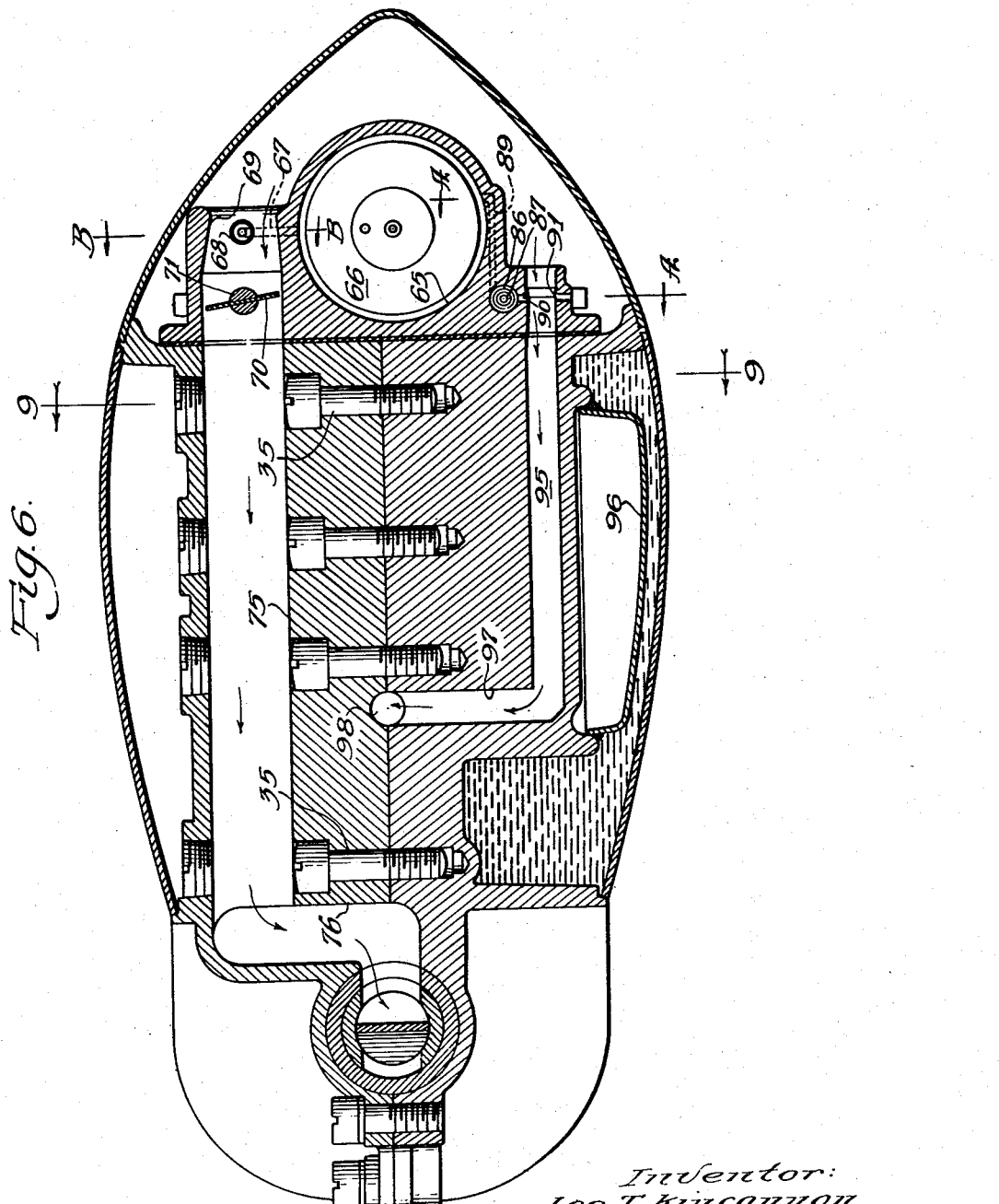
Inventor:
Leo T. Kincannon
By: Eugene d. Simpson
Attorney Feb. 1, 1949. L. T. KINCANNON 2,460,419
OUTBOARD MOTOR
Filed April 14, 1943 9 Sheets-Sheet 6

Inventor:
Leo T. Kincannon,
By: Eugene W. Simpson
Attorney

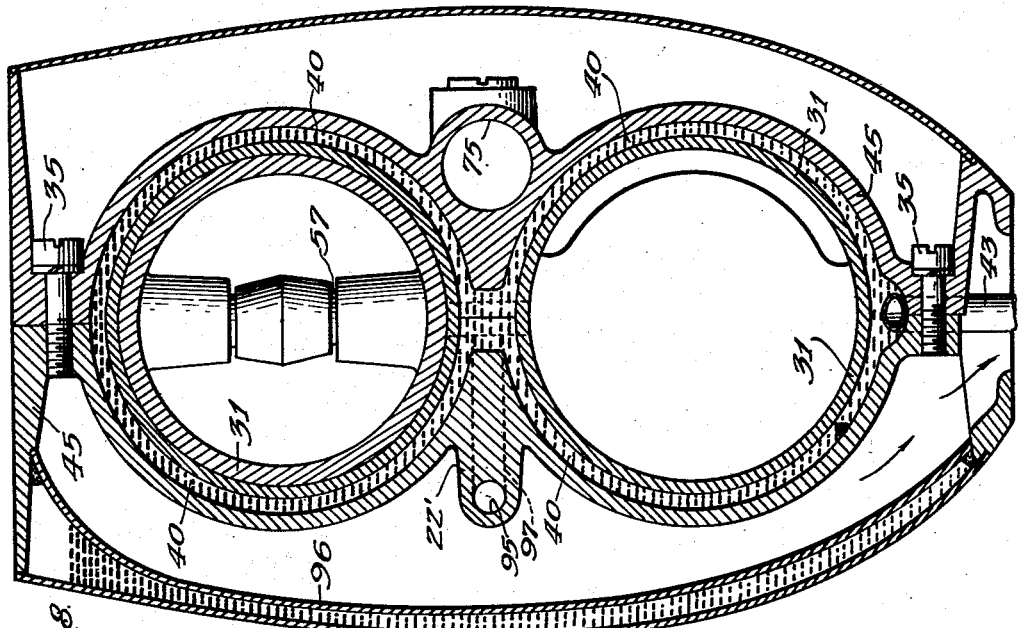
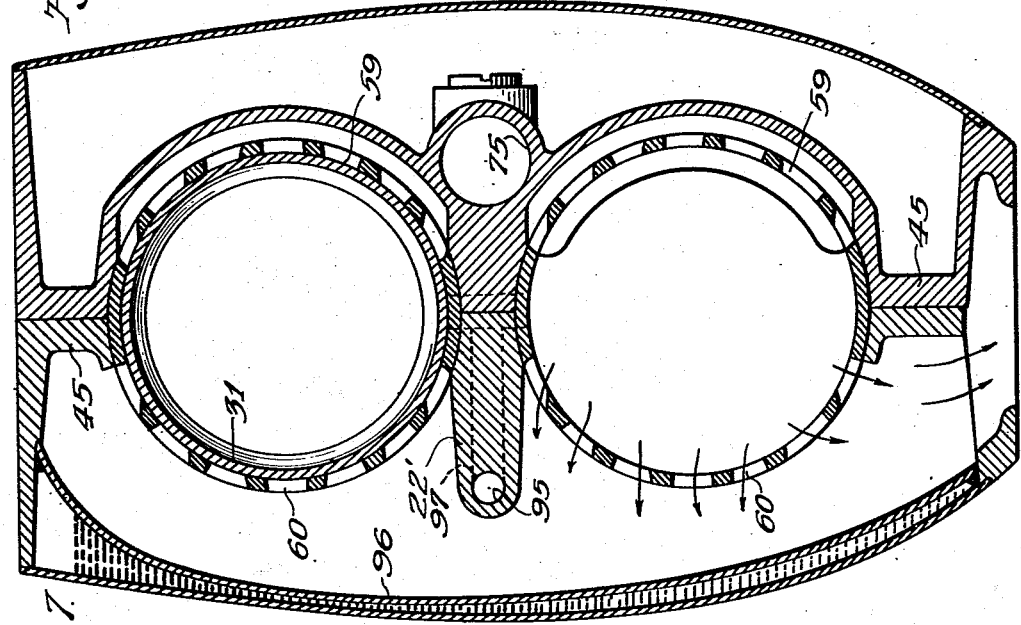

Feb. 1, 1949.  L. T. KINCANNON  2,460,419
OUTBOARD MOTOR

Filed April 14, 1943  9 Sheets-Sheet 8

Inventor:
Leo T. Kincannon
By: Eugene W. Simpson
Attorney

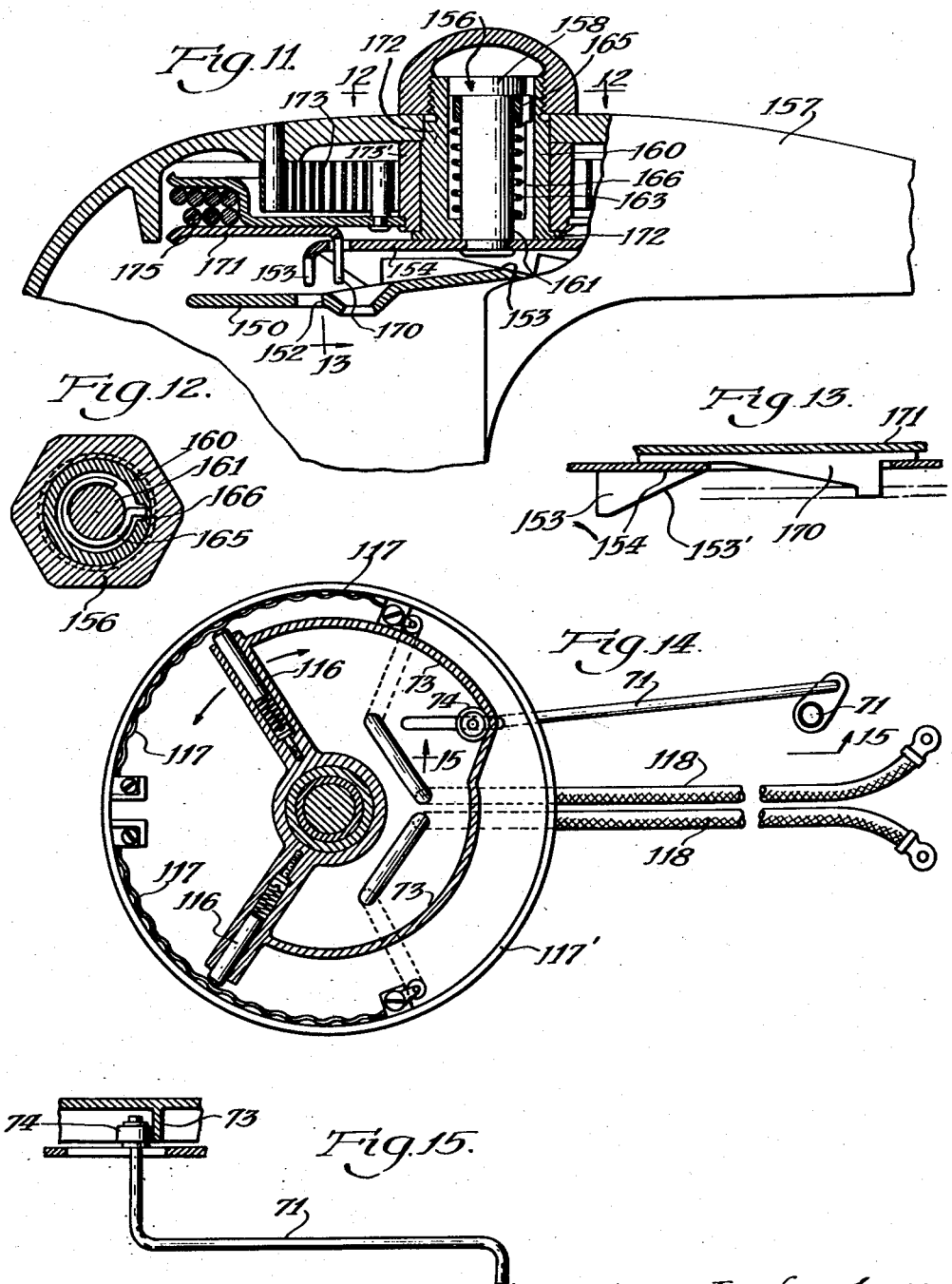

Patented Feb. 1, 1949

2,460,419

UNITED STATES PATENT OFFICE 2,460,419

OUTBOARD MOTOR

Leo T. Kincannon, Milwaukee, Wis., assignor to Metal Products Corporation, a corporation of Wisconsin Application April 14, 1943, Serial No. 482,967

12 Claims. (Cl. 115—17)

1

This invention relates to boat propulsion and more particularly to outboard motors to propel row boats, speed boats or other light crafts.

One object of the present invention is to provide an outboard motor having a starter normally held independent of the fly wheel.

Another object is to improve the starter mechanism and provide a starter which will be less likely to fail and which can be readily and economically manufactured.

A further object is to improve the electrical apparatus of outboard motors to eliminate movable wiring.

A further object is to improve the magneto of outboard motors so as to more positively set the magneto for the required timing.

A further object is to improve the construction of outboard motors by elimination of inserts in die cast parts.

A further object is to reduce the overall height of the motor.

A further object is to provide an outboard motor in which parts subject to wear may be replaced readily.

A further object is to improve the operation of outboard motors by the provision of an improved dual system of fuel supply.

A further object is to improve the operation of outboard motors by preventing condensation and free liquid gas from reaching the cylinders.

A further object is to provide an improved fuel distributing valve for the cylinders.

A further object is to improve the carburetor construction of outboard motors.

A further object is to provide an improved packing for the propeller drive shaft of outboard motors.

A further object of the invention is to provide a clutch mechanism which will release freely should the propeller strike an obstacle.

A further object is to provide an outboard motor which will operate smoothly at low speed without sacrificing power at high speed.

Other objects will become apparent upon consideration of the following specification, which when taken in conjunction with the accompanying drawings, describes and illustrates one form of the invention.

In the drawings:

Fig. 4 is a rear view of the motor;

Fig. 5 is a transverse cross-section through the water pump;

Figure 1:
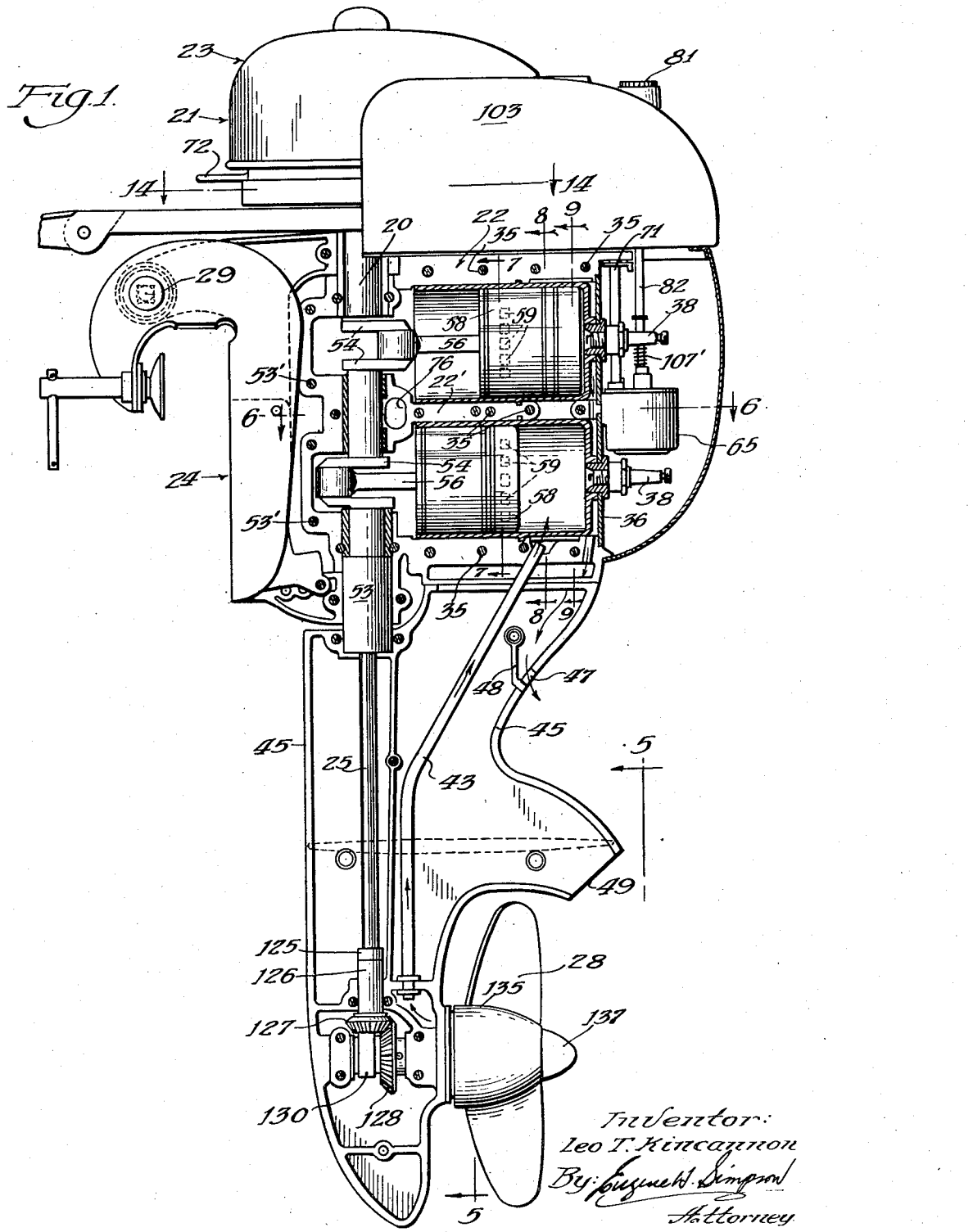
Fig. 1 is a side elevational view of an outboard motor embodying the present invention, parts thereof being shown in cross-section.
Figure 6A:
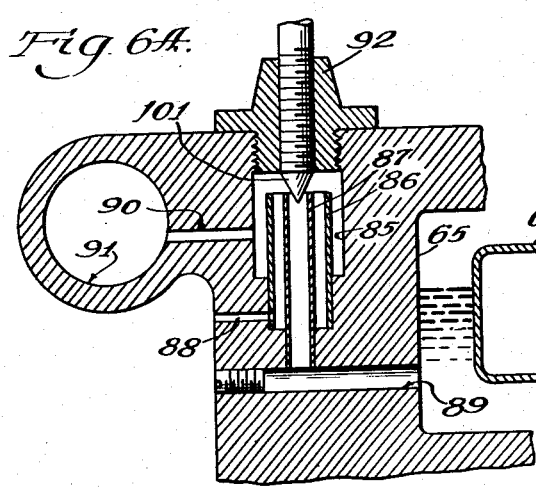
Fig. 6 is a transverse cross-section taken on the line 6—6 of Figs. 1 & 2, looking in the direction of the arrows.
Figure 6B:
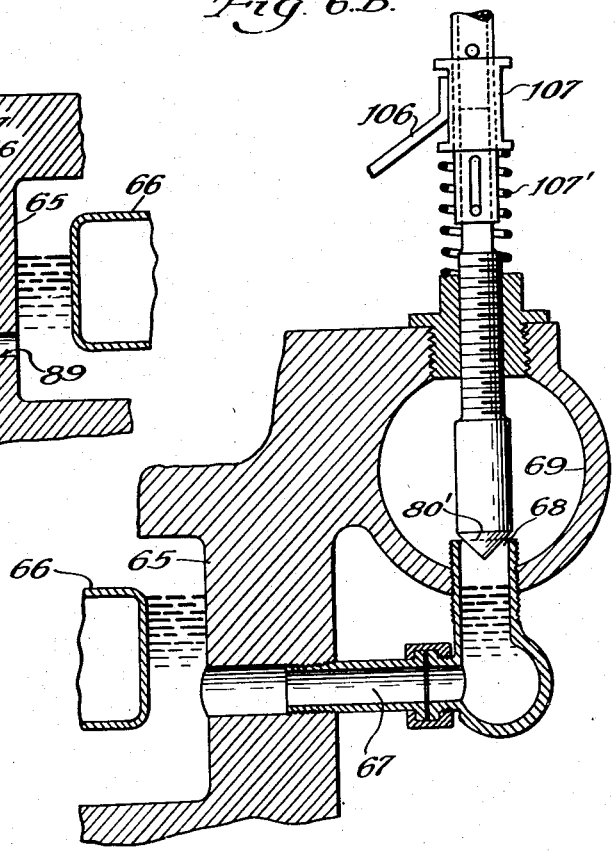
Figure 16:
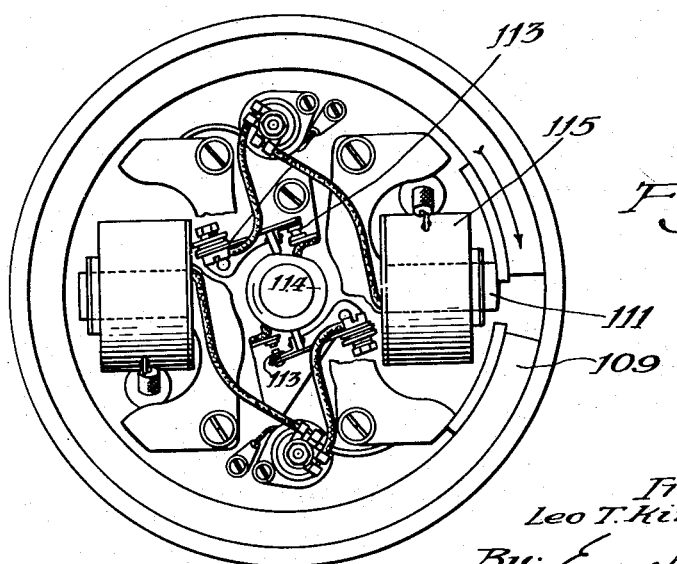
Figure 10:
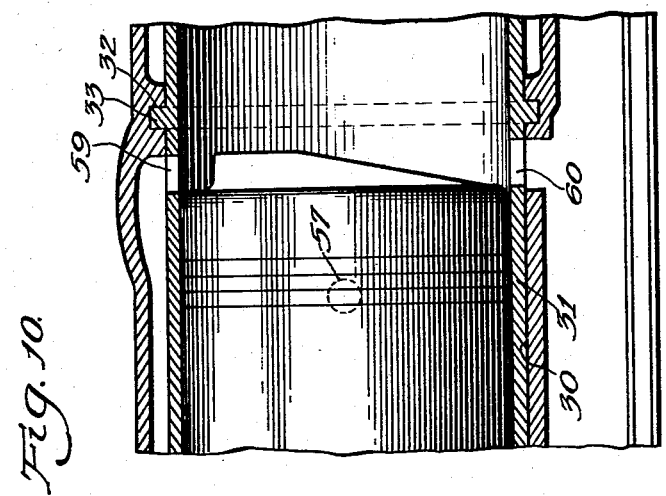
Figure 9:
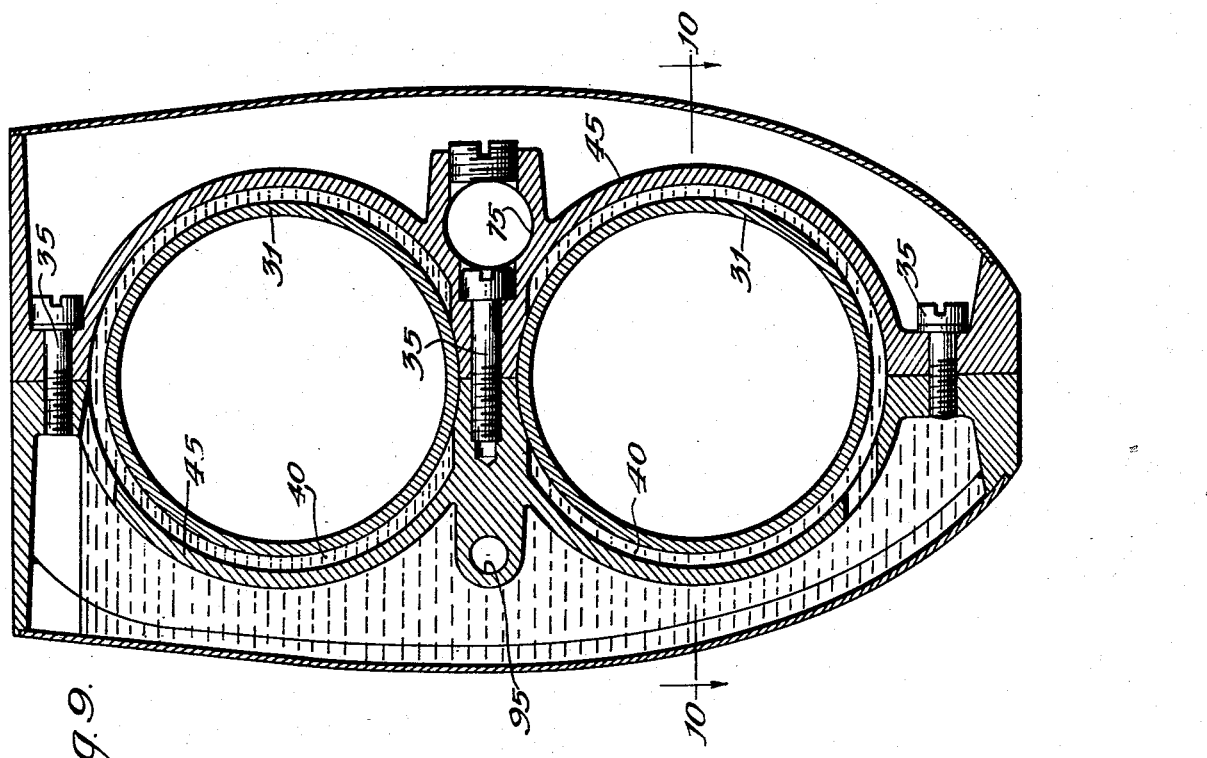

Fig. 6—A is a cross-section on the line A—A of Fig. 6, looking in the direction of the arrows;

Fig. 6—B is a cross-section on the line B—B of Fig. 6;

Figs. 7 and 8 are transverse cross-sections taken on the lines 7—7, and 8—8 respectively, of Fig. 1;

Fig. 9 is a cross-section taken on the line 9—9 of Figs. 1 and 6;

Fig. 10 is a cross-section taken on the line 10—10 of Fig. 9;

Fig. 11 is an enlarged elevational view, partly in cross-section, showing the starter mechanism;

Fig. 12 is a cross-section taken on the line 12—12 of Fig. 11;

Fig. 13 is a cross-section taken on the line 13—13 of Fig. 11;

Fig. 14 is a transverse cross-section taken on the line 14—14 of Fig. 1;

Fig. 15 is a view of the throttle taken on the line 15—15 of Fig. 14, looking in the direction of the arrows; and Fig. 16 is a top plan view of the interior of the magneto showing the arrangement of the breaker points.

According to the drawings the outboard motor, in general, comprises a shaft 20 on which is mounted a magneto 21 and a cylinder block construction 22. The engine is started by a starter generally designated 23, while the entire motor is held upon the rear end of a boat by a bracket generally designated 24. The shaft 20 has splined thereto a drive shaft 25 which drives a propeller shaft 26, connected by means of a disc clutch 27 to a propeller 28. The entire engine assembly, including the propeller 28, is pivotally mounted about an axis 29 on the bracket 24 so that the engine can be raised out of water together with the propeller 28.

The cylinder block 22 is composed of two parts split on a vertical plane and provided with longitudinal apertures 30 therethrough which receive cylinder liners 31. Circumferential apertures 32 are provided in the apertures 30 to receive annular rings 33—33 formed on the exterior of the cylinder liners 31 to properly position the cylinder liners within the cylinder block 22. The halves of the cylinder block 22 are bolted together with bolts fitting through transverse apertures 35 which bind the two halves of the block together and maintain the cylinder liners 31 securely in position.

The cylinder head end of the cylinder block is covered by a plate 36, held in position by the head of an exterior-interior threaded bushing 37 which engages an aperture in the liner and clamps the plate in fluid tight engagement with the end of the cylinder block 22.

The bushings 37 receive spark plugs 38 in their interior threads, the spark plugs having suitable connections, more fully described below, with the magneto 21 to form the firing medium for the fuel.

The cylinder block is also provided with apertures 40 which surround the combustion chambers of the cylinder liners 31 and provide a space for the circulation of water from a water pump 42, mounted on the propeller shaft through a water pipe 43. The water flows from the water pump 42 upwardly through the water pipe 43, upwardly through the aperture 40 to the top of the upper cylinder thence downwardly through an aperture 40' (Fig. 2) and enters a casing 45 surrounding the drive shaft 25, and leaves the casing through an aperture 47 therein. A partition 48 prevents the cooling water from flowing past the aperture 47 and entering the engine exhaust 49.

In starting the engine, the port 47 is normally open due to the fact that the cooling jacket 40 has not been filled with water, and hence no water is flowing out the port 47. At this time the port 47 and partition 48 form a pressure relief valve, permitting the exhaust of the engine to pass directly to the atmosphere instead of discharging through the port 49 which is normally under water. When the engine starts water covers the port 47 and forces the exhaust gases to pass through the port 49.

A horizontal partition 22' divides the engine into two separate and distinct parts, comprising an upper cylinder in the upper part and a lower cylinder in the lower part. The partition 22' prevents the free passage of gas between the cylinders while insuring proper suction of gas from the carburetor (to be described below) into the combustion chambers.

The cylinder block 22 is provided with an upper bearing 50, set in a sleeve 51, held in a vertical aperture in the cylinder block, a central bearing 52 held in a vertical aperture in the partition 22', and a lower bearing 53. The sleeve 51 is held in place by bolts 51' while the bearing 53 is held in place by bolts 53'.

Power is transmitted from the cylinders by a crank shaft having crank arms 54 joined by wrist pins 55 which retain connecting rods 56. The connecting rods are joined by piston pins to the pistons 58 operating in the cylinders 31.

The present engine, being of the two cycle type, utilizes the pistons as valves for the control of both the burnt gas and the explosive mixture. A plurality of ports 59 through one side of the cylinder walls permits the entrance of the explosive mixture, while a plurality of ports 60 on the opposite side of the cylinders permits the exhaust of burnt gases into an exhaust manifold 96 (Figs. 7 and 10).

The exhaust ports 60 extend further toward the cylinder head than do the intake ports 59 to allow a large portion of the burned gas under pressure to escape from the cylinder before entrance of the fresh explosive mixture. Explosive mixture is supplied to the cylinders from a dual fuel supply system as best shown in Figs. 6, 7, 8 and 9.

The carburetor 65 is located to the rear of the engine. The location of the carburetor in the rear of the engine permits the engine to be built lower with the main portion of the engine, including the cylinders, below the pivot 29.

For high speed operation, gasoline is supplied from the carburetor bowl 65 in which the height of the liquid is regulated by a float 66 (Fig. 2) through an aperture 67 (Fig. 6B) to a jet 68 located in a venturi 69. The control of gas is effected by a butterfly valve 70, operated by a throttle lever 71 (Figs. 2, 6, 14 and 15) which is governed by the position of a spark control lever 72 (Figs. 1 and 2) on the magneto 21 by means of a cam 73 and cam follower 74 (Figs. 14, and 15). The butterfly valve is normally held open and is only closed when the spark control lever 72 is moved to slow speed, thus cutting off gas through the high speed passage and facilitating the flow of gas through the slow speed portion of the dual fuel supply system, to be described below.

Air from the exterior enters the mouth of the venturi 69 where it becomes charged with gas from the jet 68. The mixture of air and gas flows past the butterfly valve 70 and down a passageway 75 formed in the cylinder block on the cool side of the motor, or the side remote from the exhaust manifold. The mixture is then led through a passage 76, through a port 77 in the central bearing 52, and through one of two ports 78—79 in a tubular central section 80 of the crank shaft 20. A deflector plate 81 interposed diagonally across the interior of the tubular shaft 80 directs the gaseous mixture either to the upper or lower portion of the cylinder block from whence it enters the combustion chamber through the ports 59 heretofore described.

The flow of gasoline for high speed operation is regulated by a conical valve 80', (Fig. 6—B) from a knob 81 through a tubular shaft 82, the valve being adjustable up and down to vary the size of the jet 68, the speed of the engine being controlled primarily through the timing of the ignition and the position of the butterfly valve 70.

In order to operate effectively at low speeds it is necessary to maintain the velocity of gas as high as possible. For this purpose there has been provided a second or dual gas supply, best seen in Figs. 6 and 6A. As shown, a well 85 is provided in the carburetor body adjacent the carburetor bowl 65. The well houses a first tubing 86, somewhat smaller in diameter than the well 85 and a second tubing 87 of considerably smaller outside diameter than the inside of the tube 86. A port hole 88 communicates with the atmosphere and with the interior of the tube 86, while a second port 89 in the carburetor body joins the interior of the tube 87 with the liquid gasoline in the float chamber 65. A third opening 90 is formed in the carburetor body between the interior of the well 85 and a Venturi passage 91. The top of the well is plugged by a plug 92. Air passing through the venturi 91 has an aspirator effect, creating a vacuum in the opening 90 and in the well 85. Such a vacuum raises the level of the gasoline in the tube 87 and simultaneously draws air through the aperture 88 and upwardly around the tube 87 and over the top thereof, creating a further vacuum in the tube 87 and vaporizing and drawing gasoline from that tube.

Gasoline vapors are carried through the opening 90 into the venturi 91 and thence through a passage 95 in the cylinder block 22. The passage 95 passes through the exhaust manifold 96 which provides heat to the gas passing therethrough and aids in maintaining the mixture in gaseous form.

From the passage 95 the gas enters passages 97, 98 and 99 (Figs. 2 and 6) and enters the interior of the cylinder below the skirt of the piston 58 when the piston is adjacent upper dead center. On the suction stroke of the piston the gas from the passages 95, 97, 98 and 99 is forced around the end of the cylinder 31 by the descending piston and enters the intake ports 59, through which the high speed mixture is likewise adapted to pass.

Fuel from the low speed side of the engine may be regulated from a knob 100, which controls the action of a conical valve 101, passing through the plug 92 and best seen in Figs. 4 and 6—A.

It will be noted that during normal operation gas is supplied to the engine through both the high speed and low speed passage and that as the speed is reduced, the butterfly 70 closes the passage 75 so that for slow speed operation the passage 75 is entirely closed and gas is supplied solely through the passage 95.

It will also be noted that the high speed operation of the engine is effected through the passage 75, which is on the cool side of the motor remote from the exhaust manifold, giving a maximum volumetric efficiency, while the slow speed operation is effected through the hot part of the engine, thus pre-heating the mixture and aiding in the maintenance of vaporization.

Figure 2:
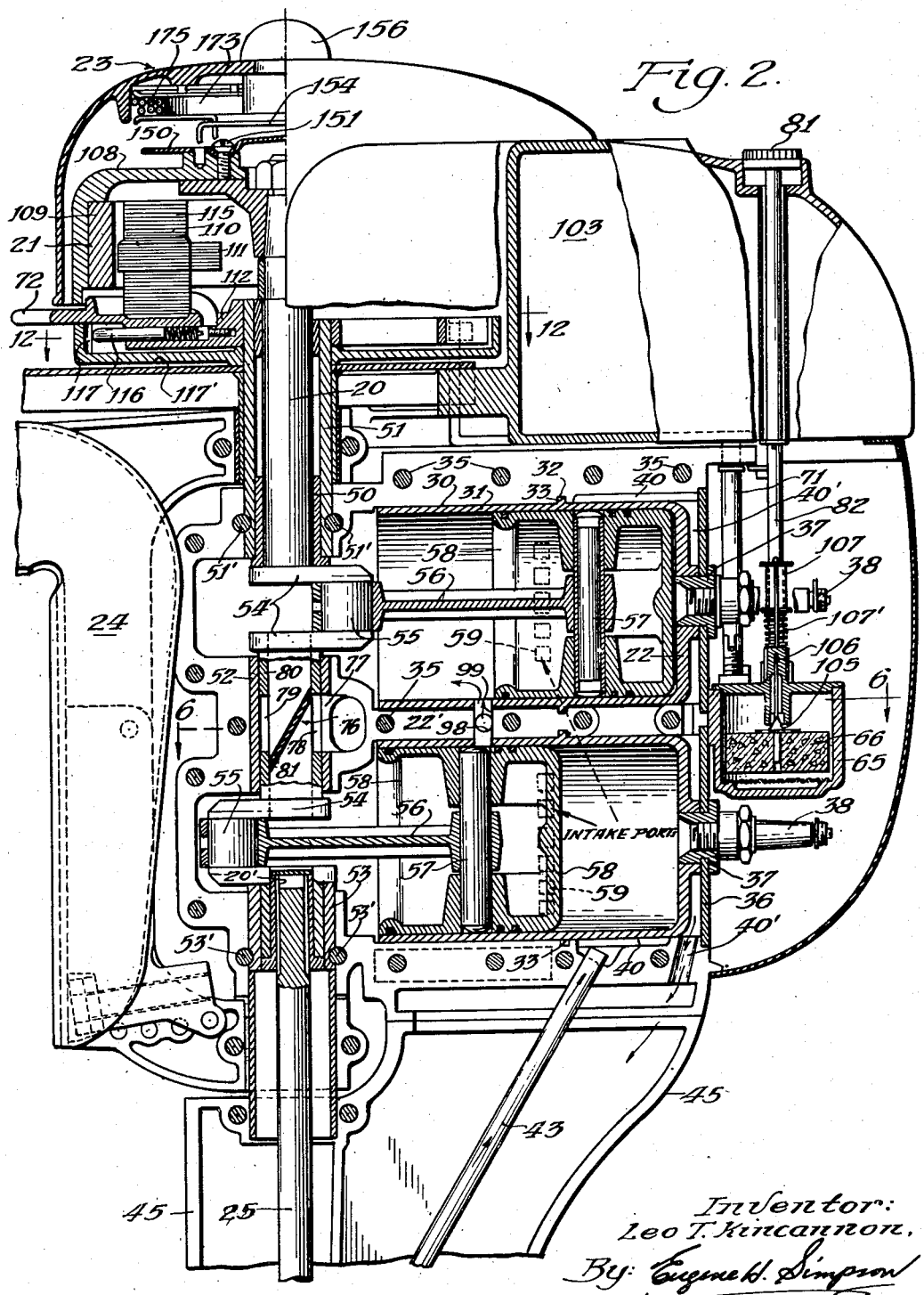
Fig. 2 is an enlarged longitudinal cross-sectional view of the motor, magneto and starter.

Gasoline is supplied from a gas tank 103 through a pipe 104 (Fig. 4) to the carburetor 65, the height of gasoline in the carburetor being controlled by a float valve 105, actuated by the float 66. The carburetor 65 may be flooded by depressing the high speed control knob 81 which depresses the control tube 82, as best seen in Figs. 2, 4 and 6—B. Lowering the tube 82 lowers the flooding rod 106 through a collar 107 best shown in Fig. 6—B. Lowering the flooding rod lowers the float 66, opening the valve 105, permitting more gasoline to pass from the tank 14 through the tube into the carburetor bowl 65. The flooding rod 106 is raised to normal position by a spring 107' upon release of pressure on the knob 81.

Ignition of the mixture in the cylinder is accomplished by the magneto generally designated 21. The magneto has a flywheel 108 fixed on the shaft 20 and rotatable therewith. Permanent magnets 109 are mounted in the fly-wheel and excite primary coils 110. The coils 110 are mounted on fixed fields 111 (shown in Figs. 2 and 16) which are carried on a plate 112. The plate 112 is mounted to rotate on the sleeve 51 to a fixed position about the shaft 20.

The plate 112 carries breaker points 113—113 (Fig. 16) which are made and broken by a cam 114 carried on the shaft 20. Making and breaking the points 113—113 makes and breaks the circuit through the primary coils 110, which induces a current in secondary coils 115 wound around the coils 110. The secondary coils are connected to spring actuated plungers 116 which contact rings 117 (Figs. 2 and 14). The rings are made corrugated, as shown in Fig. 14, so as to retain the plate 112 in the desired adjusted position through the plungers 116, and are mounted in a casing 117' which is stationary relative to the motor.

Wires 118 are connected to the ends of the rings 117 (Fig. 114) and join the rings 117 with the spark plugs 38, so that the electric current is transmitted from the secondary 115 of the magneto 21 through the plungers 116, the rings 117, the wires 118 and the spark plugs 38 to create the spark within the cylinders which ignites the fuel.

It will be noted that the wires 118 originate at the rear of the motor, and that they are stationary and are fully concealed within the motor casing and do not move with the movement of the plate 112. Thus movable wires have been eliminated from the present outboard motor avoiding the danger of wires breaking with a resulting cessation in operation.

Figure 3:
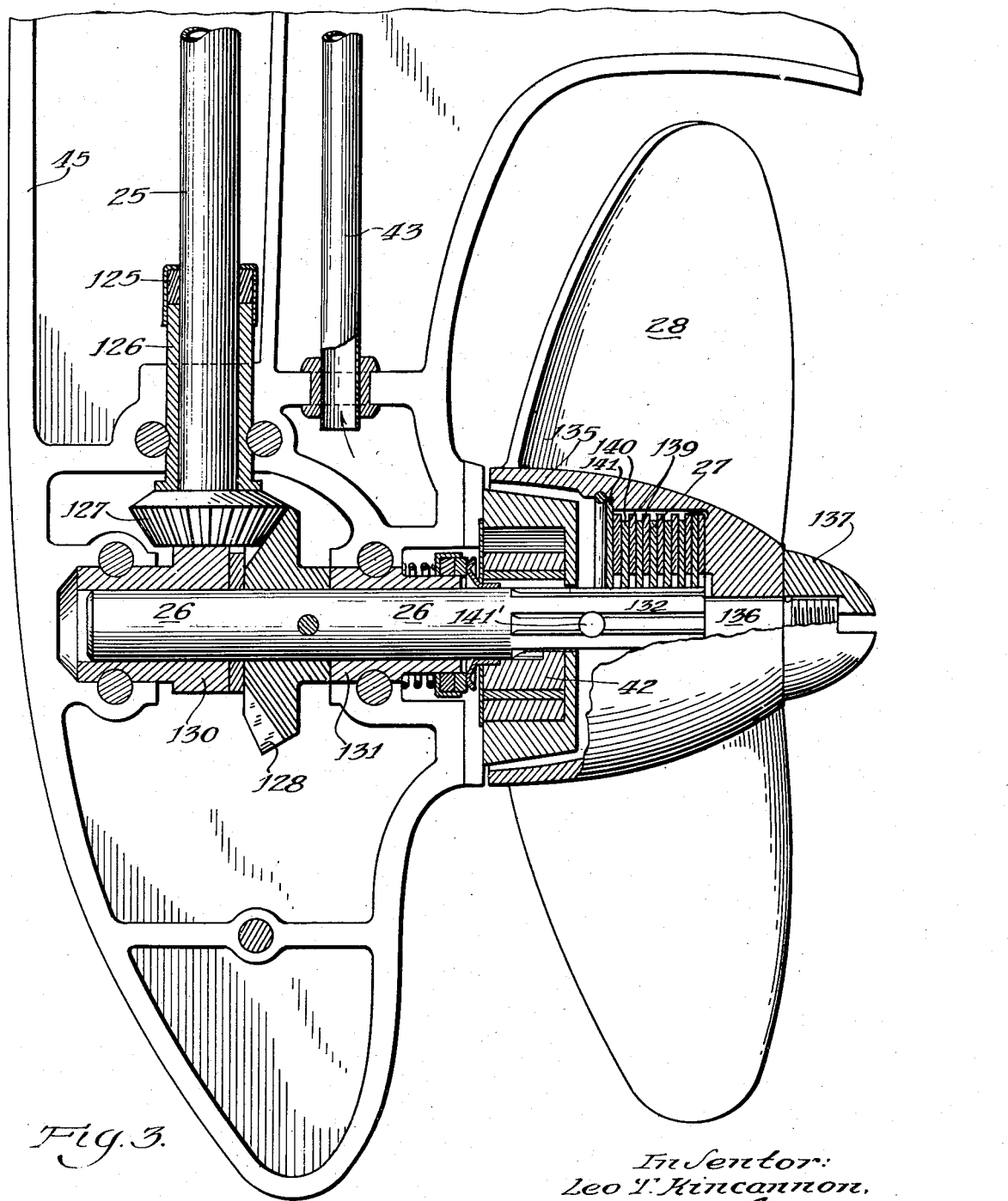
Fig. 3 is an enlarged longitudinal view of the propeller and drive shaft, and shows details of the release clutch.

The crank shaft 20 has an interior spline 20' at the lower end thereof which receives the drive shaft 25. The drive shaft passes through a packing 125 (Fig. 3) and through a bearing 126 mounted in the drive shaft housing 45. The lower end of the drive shaft 25 is provided with a bevel pinion 127 which meshes with a bevel gear 128 which is fixed on the propeller shaft 26.

The propeller shaft 26 is mounted in a pair of bearings 130—131 in the housing 45, and projects therefrom and terminates in a spline end 132.

Immediately past the bearing 131 is the water pump 42 heretofore mentioned, which is of the oscillating type, (best seen in Fig. 5) and is designed with a side intake and outlet to facilitate stream lining and prevent the bulge on the shaft housing usually obtained in such pumps.

The propeller 28 is constructed on the exterior of a hub 135 which is mounted on a stub extension 136 of the shaft 26 beyond the spline 132, and is secured thereon by a nut 137. The hub 135 has an interior cavity a portion of which extends over and encloses the pump 42. The innermost portion of the cavity is splined to receive alternate discs 139 of a clutch. Mating discs 140 are retained on the splined end of the shaft 132 so that pressure created by the propeller 28 compresses the discs against each other and against a plate 151 and pin 141' and form a drive for the propeller. The clutch is, therefore, engaged by the thrust of the water on the propeller, and any stoppage of the propeller automatically relieves the pressure and disengages the clutch. Should the propeller strike an object the thrust from the propeller is removed and the propeller is disengaged from the engine thus avoiding breakage to the engine or propeller.

The engine starter 23 which is shown in Figs. 2, 11, 12 and 13, is of the manual concealed cord type and comprises an annular plate 150 fixed to the fly-wheel 108 by screws 151. The plate 150 has a plurality of circumferential apertures 152 which are engaged by depending lugs 153 on an actuator plate 154. The actuator plate 154 is mounted on a hub 156 in the top of the casing 157.

The hub 156 which is concentric with the shaft 20 has a larger diameter 158 which has a working fit in the upper part of a bearing 160 and a smaller diameter 161 which has a working fit in the lower part of the bearing 160. A spring 163 urges the hub 156 and plate into its uppermost position in which the lugs are out of engagement with the plate 150.

The actuator plate 154 is operated by a plurality of cam fingers 170 which depend from a pulley 171. In order to permit the cams 170 to act on the plate, a spring 165 (Fig. 12) embraces the upper end of the diameter 161 and has the free end receivable in a slot 166 in the bearing. The spring 165 acts as a drag in one direction which permits the plate 154 to move down under the influence of the cam surfaces 170 while allowing the plate 154 to rotate freely in the opposite direction. The pulley is mounted to rotate about a depending hub 172 in the top of the casing 157 and is urged into retracted position by a spring 173. The pulley is operated by a rope or cord 175 one end of which is maintained outside the casing.

To start the motor the knob 81 may first be depressed to flood the carburetor, and the cord 175 pulled to rotate the pulley. Rotation of the pulley 171 brings the cam surfaces on the fingers 170 into engagement with the actuator plate 154 forcing the plate 154 downwardly into engagement with the plate 150. Further rotation of the pulley 171 rotates the shaft 20, drawing in a mixture of air and gas through the low speed passage 95 and through the intake ports 59. This mixture is compressed and fired at the outer end of the stroke by the spark generated by the magneto and produced by breaking the contacts 113.

When the motor starts, the spring 163 urges the plate 154 upward and normally accomplishes that result. However, if for any reason the plate 154 fails to move up under the action of the spring 163, the trailing edges of the apertures 152 in the plate 150 contact cam surfaces 153' on the trailing edges of the lugs 153 to force the plate 154 completely free of the plate 150 and other rotating parts of the engine.

It will be noted that, if desired, the entire motor may be made of two castings, split on a vertical plane, as shown in Fig. 6, and that the outer casing, including the shaft casing 45, may be formed integral with the motor castings.

Having thus described the invention it is realized that it is susceptible to various changes and modifications and it is not therefore desired to limit the invention to the precise form herein shown and described but only by the scope of the appended claims.

What is claimed as new and desired to secure by Letters Patent is:

1. In an internal combustion engine, the combination of a motor casing having a bore therein adapted to receive a cylinder and a crank case, said casing being made in parts split in a plane substantially through the center line of the cylinder and the crank case, a cylinder in said bore having an integral head, means to clamp the two parts of the casing together with the cylinder in place therein, said cylinder and casing having a direct interlocking connection intermediate the ends of said cylinder to positively prevent longitudinal movement of said cylinder relative to said casing and completed when said parts of said casing are clamped together, and means cooperating with said casing to form a water jacket space for said head.

2. In an outboard motor of the character described, a motor casing having a bore therein adapted to receive a cylinder liner and made in parts split in a plane substantially through the center line of said liner, said bore having an intermediately disposed annular recess therein and a water jacket space at its head end, a cylinder liner in said bore, a head formed on said cylinder liner, an external annular projection on said liner engageable in the annular recess to position the liner in the casing and prevent longitudinal movement thereof relative to said casing and completed when said parts of said casing are clamped together, means to clamp the two parts of said casing together with said cylinder liner in place therein, a cover for the head end of said casing, and means to secure the cover to the head of said cylinder and to said casing in fluid tight engagement therewith.

3. In an outboard motor, the combination of a motor casing having a cylindrical bore passing therethrough having a water jacket space at its head end, a cylinder liner including a head, a cover for the head end of said bore, means to clamp said cover to said casing and to said head, a crankshaft, said motor casing having a crank case portion and being made in parts split on a plane through the axis of said cylinder and crankshaft, means to clamp the two parts of said casing together with the crankshaft and cylinder in place, and an interlocking connection between said liner and an intermediate part of said casing to prevent longitudinal movement of said liner relative to said casing and completed when said casing parts are clamped together.

4. In an outboard motor, the combination of a motor casing having a bore therein adapted to receive a cylinder liner, said bore having an intermediately disposed annular recess therein, said casing being divided lengthwise in two halves, a cylinder liner mounted in said bore and having an integral head portion and an external annular projection engageable in said annular recess to position said liner in said casing and forming an interlocking connection therewith completed when said casing halves are secured together, and means to secure the parts of said casing together with said liner in place therein.

5. In a two cycle internal combustion engine, the combination of a motor casing having a bore therein adapted to receive a cylinder liner and made in two parts split in a plane substantially through the longitudinal center line of said liner, a cylinder liner having intake and exhaust ports therein, a radial annular projection above said ports and an integral head, said motor casing having a water jacket space for the upper portion of said liner and an annular groove below said space to receive said annular projection and interlock therewith when the parts of said casing are secured together, means for securing the two parts of said casing together with said liner in place therein, and means connected to said head for clamping one side of said annular projection to one side of said annular groove.

6. In a two cycle internal combustion engine, the combination of a motor casing having a bore adapted to receive a cylinder liner and made in two parts split in a plane substantially through the center line of said liner, a cylinder liner having intake and exhaust ports therein, a radial annular projection above said ports and an integral head, said motor casing having a jacket space for the upper portion of said liner and an annular groove below said space to receive said annular projection, means for securing the two parts of said casing together with said liner in place therein, a cover for the jacket space of the motor casing, and means to clamp said cover to the casing and to the head in fluid tight engagement therewith and also to clamp one side of said annular projection to one side of said annular groove.

7. In an internal combustion engine, the combination of a longitudinally split casing having a bore therein with a jacket space at its open head end and an annular recess, a cylinder liner fitting in said bore and including a head and having an external annular projection engageable in said annular recess, means to secure together the parts of said casing to interlock said liner with said casing, a detachable cover overlapping the outer end of said bore, and means to simultaneously secure said cover in fluid-tight engagement with said casing and head and one side of said projection against a side of said recess.

8. In an internal combustion engine, the combination of a longitudinally split casing having a bore therein provided with an annular recess and an open outer end, a cylinder liner including a head disposed in said bore and having an external annular projection engageable in said recess, means to secure together the parts of said casing to interlock said liner with said casing, a detachable cover overlapping the outer end of said casing and a portion of said head, and a spark plug carrying bushing in threaded engagement with the head of said liner to simultaneously clamp said cover in fluid-tight engagement with said casing and said head and one side of said projection against one side of said recess.

9. In an internal combustion engine, the combination of a longitudinal split casing having a bore therein with a water jacket space at its open head end, means to secure the parts of said casing together, a cylinder liner disposed in said bore and including a head, an interlocking connection between said casing and liner intermediate the ends thereof completed when the parts of said casing are secured together, a detachable cover for the said open head end, and means to simultaneously clamp said cover to said casing and to said cylinder liner in fluid-tight engagement therewith and draw the parts of said interlocking connection into fluid-tight engagement with each other.

10. In an outboard motor, the combination of a motor casing having spaced cylindrical bores therein and a crank case portion for each bore and made in two parts split on a plane through the axes of both bores and crank cases, cylinder liners for each of said bores having integral head portions, an interlocking connection between each liner and an intermediate part of the bores of said casing to prevent longitudinal movement of the liner relative to said casing and completed when said parts of said casing are clamped together, and means to clamp the two parts of said casing together with the liners in place therein.

11. In an outboard motor or the like having a crank shaft, a drive shaft connected with the crank shaft, a propeller shaft and a gearing connection between said drive shaft and propeller shaft and a separable cylinder adapted for disposal in operative relation with said crank shaft, a casing made in two complementary parts which form a housing for the above named parts in their operative positions, said casing parts joining on a plane through the axes of said cylinder, a crank shaft, drive shaft, gearing connection and said propeller shaft, and means to secure the parts of said casing together with the cylinder, said shafts and gearing connection in place therein.

12. An outboard motor according to claim 11 in which the casing parts also include an underwater exhaust passage extending adjacent the drive shaft but isolated therefrom.

LEO T. KINCANNON.

REFERENCES CITED

The following references are of record in the file of this patent:

UNITED STATES PATENTS

| Number | Name | Date |
| --- | --- | --- |
| 830,099 | Packard | Sept. 4, 1906 |
| 962,254 | Rockwell | June 21, 1910 |
| 1,071,781 | Nelson | Sept. 2, 1913 |
| 1,204,674 | Lohner | Nov. 14, 1916 |
| 1,210,537 | Roberts | Jan. 2, 1917 |
| 1,251,627 | Bie | Jan. 1, 1918 |
| 1,255,462 | Radovanovic | Feb. 5, 1918 |
| 1,267,253 | Murray | May 21, 1918 |
| 1,402,695 | Wall | Jan. 3, 1922 |
| 1,442,523 | Goby | Jan. 16, 1923 |
| 1,525,755 | Link | Feb. 10, 1925 |
| 1,553,714 | Pellet | Sept. 15, 1925 |
| 1,639,339 | Grass | Aug. 16, 1927 |
| 1,919,793 | Linga | July 25, 1933 |
| 1,962,962 | Linder | June 12, 1934 |
| 2,007,575 | LeSage | July 9, 1935 |
| 2,013,734 | Prentiss | Sept. 10, 1935 |
| 2,029,666 | Markwart | Feb. 4, 1936 |
| 2,031,042 | Herrington | Feb. 18, 1936 |
| 2,039,535 | Irgens | May 5, 1936 |
| 2,069,319 | Irgens | Feb. 2, 1937 |
| 2,070,405 | Irgens | Feb. 9, 1937 |
| 2,093,357 | Harper | Sept. 14, 1937 |
| 2,125,270 | Conover | Aug. 2, 1938 |
| 2,154,975 | Dufour | Apr. 18, 1939 |
| 2,227,392 | Kuzmitz | Dec. 31, 1940 |

Certificate of Correction

Patent No. 2,460,419.

February 1, 1949.

LEO T. KINCANNON

It is hereby certified that errors appear in the printed specification of the above numbered patent requiring correction as follows:

Column 5, line 75, for "(Fig. 114)" read *(Fig. 14)*; column 6, line 43, for "plate 151" read *plate 141*; column 10, line 9, claim 11, strike out "a" before "crank"; and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*